US011093453B1

(12) United States Patent
Reza et al.

(10) Patent No.: US 11,093,453 B1
(45) Date of Patent: Aug. 17, 2021

(54) SYSTEM AND METHOD FOR ASYNCHRONOUS CLEANING OF DATA OBJECTS ON CLOUD PARTITION IN A FILE SYSTEM WITH DEDUPLICATION

(71) Applicant: EMC IP Holding Company LLC, Hopkinton, MA (US)

(72) Inventors: Abdullah Reza, Gilroy, CA (US); Abhinav Duggal, Santa Clara, CA (US); Lan Bai, Chelsea, MI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 15/692,886

(22) Filed: Aug. 31, 2017

(51) Int. Cl.
*G06F 16/174* (2019.01)
*G06F 3/06* (2006.01)
*G06F 16/11* (2019.01)
*G06F 16/16* (2019.01)
*G06F 16/17* (2019.01)

(52) U.S. Cl.
CPC .......... *G06F 16/1748* (2019.01); *G06F 3/065* (2013.01); *G06F 3/067* (2013.01); *G06F 3/0619* (2013.01); *G06F 3/0641* (2013.01); *G06F 16/125* (2019.01); *G06F 16/162* (2019.01); *G06F 16/1727* (2019.01)

(58) Field of Classification Search
CPC ............... G06F 16/1748; G06F 16/125; G06F 16/1727; G06F 16/162; G06F 3/067; G06F 3/065; G06F 3/0641; G06F 3/0619
See application file for complete search history.

(56) References Cited

U.S. PATENT DOCUMENTS

| 7,085,911 | B2 | 8/2006 | Sachedina et al. |
| 7,818,515 | B1 | 10/2010 | Umbehocker et al. |
| 8,046,551 | B1 | 10/2011 | Sahin |
| 8,190,835 | B1 | 5/2012 | Yueh |
| 8,204,868 | B1 | 6/2012 | Wu et al. |
| 8,396,841 | B1 | 3/2013 | Janakiraman |
| 8,732,403 | B1 | 5/2014 | Nayak |

(Continued)

FOREIGN PATENT DOCUMENTS

| EP | 2738665 A1 | 6/2014 |
| EP | 2810171 B1 | 7/2019 |

(Continued)

OTHER PUBLICATIONS

Extended European Search Report issued in corresponding European Application No. 18184842.5, dated Sep. 19, 2018.

(Continued)

*Primary Examiner* — Pierre M Vital
*Assistant Examiner* — Andalib F Lodhi
(74) *Attorney, Agent, or Firm* — Chamberlain, Hrdlicka, White, Williams & Aughtry

(57) ABSTRACT

A data management device includes a persistent storage and a processor. The persistent storage includes meta-data of data stored in a long term retention (LTR) storage. The processor obtains a file storage request for a file and deduplicates the file against segments stored in the LTR storage while performing garbage collection on the LTR storage. Performing garbage collection includes deleting segments of the data stored in the LTR storage using the meta-data. The meta-data is not stored in the LTR storage.

13 Claims, 17 Drawing Sheets

(56) References Cited

U.S. PATENT DOCUMENTS

| | | | |
|---|---|---|---|
| 8,782,323 B2 | 7/2014 | Glikson et al. | |
| 8,898,114 B1 | 11/2014 | Feathergill et al. | |
| 8,898,120 B1 | 11/2014 | Efstathopoulos | |
| 8,904,120 B1 | 12/2014 | Killammsetti et al. | |
| 8,918,390 B1 | 12/2014 | Shilane et al. | |
| 8,943,032 B1 | 1/2015 | Xu et al. | |
| 8,949,208 B1 | 2/2015 | Xu et al. | |
| 8,949,560 B1* | 2/2015 | Blitzer | G06F 9/45533 711/162 |
| 9,183,200 B1* | 11/2015 | Liu | G06F 16/278 |
| 9,244,623 B1 | 1/2016 | Bent et al. | |
| 9,250,823 B1 | 2/2016 | Kamat et al. | |
| 9,251,160 B1 | 2/2016 | Wartnick | |
| 9,274,954 B1 | 3/2016 | Bairavasundaram et al. | |
| 9,280,550 B1 | 3/2016 | Hsu et al. | |
| 9,298,724 B1* | 3/2016 | Patil | G06F 16/1748 |
| 9,317,218 B1 | 4/2016 | Botelho et al. | |
| 9,336,143 B1 | 5/2016 | Wallace et al. | |
| 9,390,116 B1 | 7/2016 | Li et al. | |
| 9,390,281 B2 | 7/2016 | Whaley et al. | |
| 9,424,185 B1 | 8/2016 | Botelho | |
| 9,442,671 B1 | 9/2016 | Zhang et al. | |
| 9,830,111 B1 | 11/2017 | Patiejunas et al. | |
| 9,952,933 B1 | 4/2018 | Zhang | |
| 10,002,048 B2 | 6/2018 | Chennamsetty et al. | |
| 10,031,672 B2 | 7/2018 | Wang et al. | |
| 10,078,451 B1 | 9/2018 | Floyd et al. | |
| 10,102,150 B1 | 10/2018 | Visvanathan et al. | |
| 10,175,894 B1 | 1/2019 | Visvanathan et al. | |
| 10,445,292 B1 | 10/2019 | Zhang et al. | |
| 10,514,978 B1* | 12/2019 | Lee | G06F 11/0793 |
| 2003/0110263 A1 | 6/2003 | Shillo | |
| 2005/0120058 A1 | 6/2005 | Nishio | |
| 2005/0160225 A1 | 7/2005 | Presler-Marshall | |
| 2005/0182906 A1 | 8/2005 | Chatterjee et al. | |
| 2006/0075191 A1 | 4/2006 | Lolayekar et al. | |
| 2008/0082727 A1 | 4/2008 | Wang | |
| 2008/0133446 A1 | 6/2008 | Dubnicki et al. | |
| 2008/0133561 A1 | 6/2008 | Dubnicki et al. | |
| 2008/0216086 A1 | 9/2008 | Tanaka et al. | |
| 2008/0244204 A1 | 10/2008 | Cremelie et al. | |
| 2009/0235115 A1 | 9/2009 | Butlin | |
| 2009/0271454 A1 | 10/2009 | Anglin et al. | |
| 2010/0049735 A1 | 2/2010 | Hou | |
| 2010/0094817 A1 | 4/2010 | Ben-Shaul et al. | |
| 2010/0250858 A1 | 9/2010 | Cremelie et al. | |
| 2011/0055471 A1 | 3/2011 | Thatcher et al. | |
| 2011/0099200 A1 | 4/2011 | Blount et al. | |
| 2011/0099351 A1 | 4/2011 | Condict | |
| 2011/0161557 A1 | 6/2011 | Haines et al. | |
| 2011/0185149 A1 | 7/2011 | Gruhl et al. | |
| 2011/0196869 A1 | 8/2011 | Patterson et al. | |
| 2011/0231594 A1 | 9/2011 | Sugimoto et al. | |
| 2011/0276781 A1 | 11/2011 | Sengupta et al. | |
| 2012/0158670 A1 | 6/2012 | Sharma et al. | |
| 2012/0209873 A1 | 8/2012 | He | |
| 2012/0278511 A1 | 11/2012 | Alatorre et al. | |
| 2013/0036098 A1 | 2/2013 | Mutalik et al. | |
| 2013/0055018 A1 | 2/2013 | Joshi et al. | |
| 2013/0060739 A1 | 3/2013 | Kalach et al. | |
| 2013/0111262 A1 | 5/2013 | Taylor et al. | |
| 2013/0138620 A1 | 5/2013 | Yakushev et al. | |
| 2014/0012822 A1 | 1/2014 | Sachedina et al. | |
| 2014/0040205 A1 | 2/2014 | Cometto | |
| 2014/0047181 A1 | 2/2014 | Peterson et al. | |
| 2014/0101113 A1 | 4/2014 | Zhang | |
| 2014/0201169 A1 | 7/2014 | Liu | |
| 2014/0258248 A1 | 9/2014 | Lambright et al. | |
| 2014/0258824 A1 | 9/2014 | Khosla et al. | |
| 2014/0281215 A1 | 9/2014 | Chen et al. | |
| 2014/0310476 A1 | 10/2014 | Kruus | |
| 2015/0074679 A1 | 3/2015 | Fenoglio | |
| 2015/0106345 A1* | 4/2015 | Trimble | G06F 16/1748 707/692 |
| 2015/0178171 A1 | 6/2015 | Bish et al. | |
| 2015/0331622 A1 | 11/2015 | Chiu et al. | |
| 2016/0026652 A1 | 1/2016 | Zheng | |
| 2016/0112475 A1 | 4/2016 | Lawson et al. | |
| 2016/0188589 A1 | 6/2016 | Guilford et al. | |
| 2016/0224274 A1 | 8/2016 | Kato | |
| 2016/0239222 A1 | 8/2016 | Shetty et al. | |
| 2016/0323367 A1 | 11/2016 | Murtha et al. | |
| 2016/0342338 A1 | 11/2016 | Wang | |
| 2017/0093961 A1 | 3/2017 | Pacella et al. | |
| 2017/0199894 A1 | 7/2017 | Aronovich | |
| 2017/0220281 A1 | 8/2017 | Gupta et al. | |
| 2017/0220334 A1 | 8/2017 | Hart | |
| 2017/0300424 A1* | 10/2017 | Beaverson | G06F 12/0246 |
| 2017/0352038 A1 | 12/2017 | Parekh | |
| 2017/0359411 A1 | 12/2017 | Burns et al. | |
| 2018/0089037 A1 | 3/2018 | Liu et al. | |
| 2018/0146068 A1 | 5/2018 | Johnston et al. | |
| 2018/0322062 A1 | 11/2018 | Watkins et al. | |

FOREIGN PATENT DOCUMENTS

| | | |
|---|---|---|
| WO | 2013056220 A1 | 4/2013 |
| WO | 2013115822 A1 | 8/2013 |
| WO | 2014185918 A1 | 11/2014 |

OTHER PUBLICATIONS

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

Deepavali Bhagwat et al.; "Extreme Binning: Scalable, Parallel Deduplication for Chunk-based File Backup"; IEEE MASCOTS; Sep. 2009 (10 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

International Search Report and Written Opinion issued in corresponding WO application No. PCT/US2018/027642, dated Jun. 7, 2018 (15 pages).

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

International Search Report and Written Opinion issued in corresponding PCT Application PCT/US2018/027646, dated Jul. 27, 2018. (30 pages).

Aseem Kishore, "What is a Checksum and How to Calculate a Checksum", Retrieved from the Internet: https://www.online-techtips.com /cool -websites /what -is- checksum /, Feb. 18, 2015.

* cited by examiner

SYSTEM AND METHOD FOR ASYNCHRONOUS CLEANING OF DATA OBJECTS ON CLOUD PARTITION IN A FILE SYSTEM WITH DEDUPLICATION

BACKGROUND

Computing devices generate, use, and store data. The data may be, for example, images, documents, webpages, or meta-data associated with the data. The data may be stored on a persistent storage. Stored data may be deleted from the persistent storage.

SUMMARY

In one aspect, a data management device in accordance with one or more embodiments of the invention includes a persistent storage and a processor. The persistent storage includes meta-data of data stored in a long term retention (LTR) storage. The processor obtains a file storage request for a file and deduplicates the file against segments stored in the LTR storage while performing garbage collection on the LTR storage. Performing garbage collection includes deleting segments of files stored in the LTR storage using the meta-data. The meta-data is not stored in the LTR storage.

In one aspect, a method of operating a data management device in accordance with one or more embodiments of the invention includes obtaining, by the data management device, a file storage request for a file and deduplicating, by the data management device, the file against segments stored in a long term retention (LTR) storage while performing garbage collection on the LTR storage. Performing garbage collection includes deleting segments stored in the LTR storage using meta-data associated with the segments. The meta-data is not stored in the LTR storage.

In one aspect, a non-transitory computer readable medium in accordance with one or more embodiments of the invention includes computer readable program code, which when executed by a computer processor enables the computer processor to perform a method for operating a data management device, the method includes obtaining, by the data management device, a file storage request; and deduplicating, by the data management device, the file against segments stored in a long term retention (LIR) storage while performing garbage collection on the LTR storage. Performing garbage collection includes deleting segments of files stored in the LTR storage using meta-data associated with the segments. The meta-data is not stored in the LTR storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
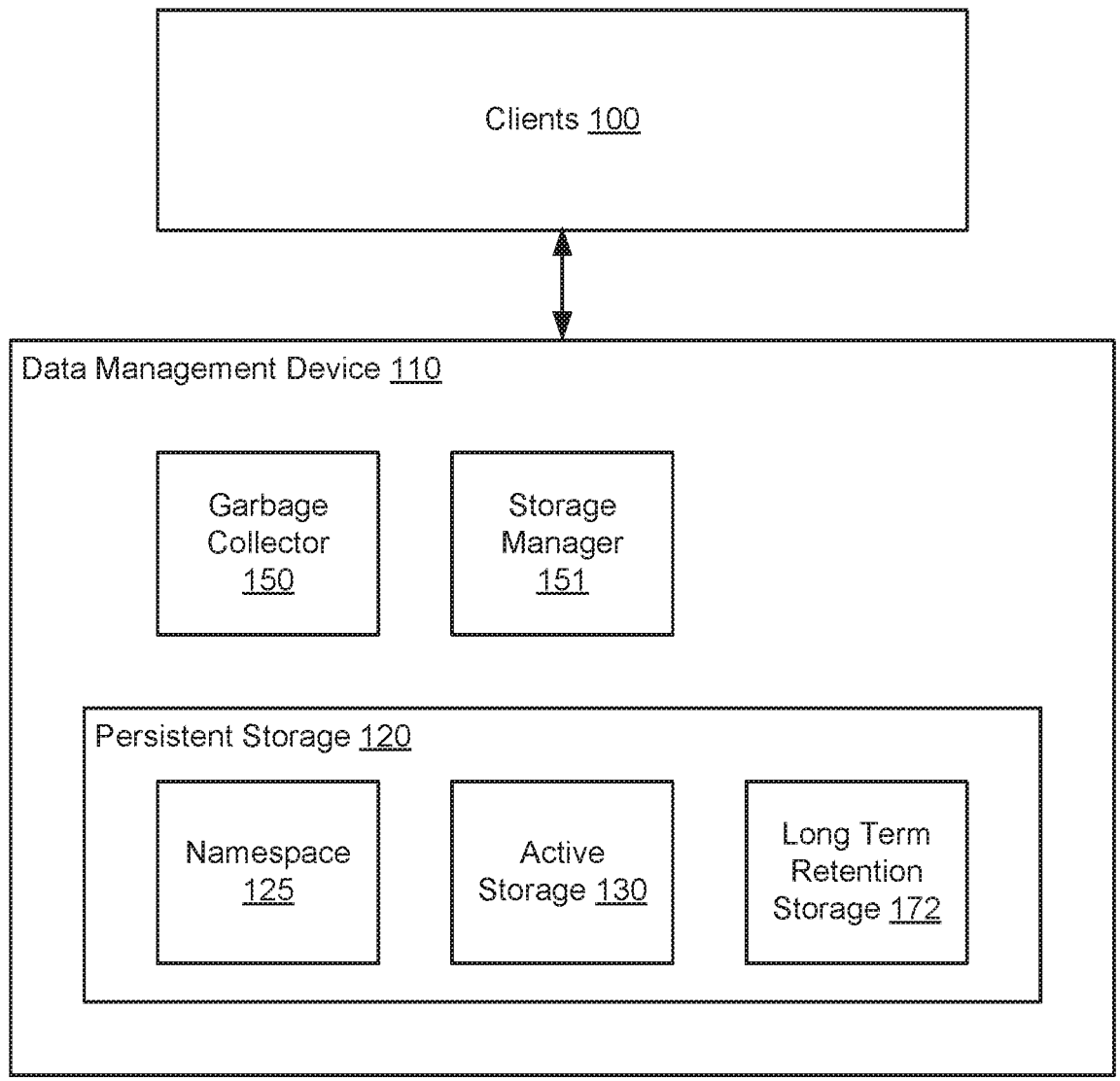
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by, reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may reduce the amount of storage required to store data.

In one or more embodiments of the invention, a data management device may include a persistent storage. The persistent storage may host one or more object storages. Each of the object storages may store different types of objects. The objects may include data, meta-data regarding the data, data structure information that specifies relationships between data stored in the object storage, and/or device control information.

In one or more embodiments of the invention, the one or more object storages may be deduplicated storages. Data to-be-stored in the object storages may be deduplicated, before storage, by: dividing the to-be-stored data into segments, identifying segments that are duplicates of segments already stored in an object storage, deleting the identified duplicate segments, and storing the remaining segments in data objects of the object storage. Meta-data corresponding to the now-stored segments may, also be stored in an object storage. Removing the duplicate segments, before storing the segments of a data, may reduce the quantity of storage required to store the to-be-stored data when compared to the quantity of storage space required to store the to-be-stored data without being deduplicated.

In one or more embodiments of the invention, segments of the data and meta-data associated with the segments may be stored in different object storages. In other words, data may be stored in a first object storage while meta-data associated with the data may be stored in a second object storage.

In one or more embodiments of the invention, the persistent storage may be a distributed storage. In other words, the persistent storage may include physical storage devices of multiple computing devices. The computing devices may be operably connected by a network. The object storages, hosted by the persistent storage, may utilize the physical storage devices of the multiple computing devices. For example, physical storage devices of a first computing device may be used to host an object storage that stores meta-data and physical storage devices of a cloud computing resource may be used to host an object storage that stores the data.

In one or more embodiments of the invention, the data management device may perform garbage collection to free allocated storage of the persistent storage and thereby reduce the amount of storage required to store data. As used herein, garbage collection refers to the process of deleting data stored in the persistent storage that is no longer to be stored in the persistent storage. For example, a client may notify that data previously stored in the object storage is to be deleted. In response, the data management device may delete one or more segments associated with the stored data during a garbage collection process. The data management device may perform garbage collection while continuing to store data in the persistent storage.

As used here, performing garbage collection while continuing to store data in the persistent storage includes performing garbage collection while simultaneously performing deduplication, performing garbage collection while concurrently performing deduplication, and performing garbage collection asynchronously from performing deduplication. Performing both simultaneously means performing both garbage collection and deduplication at the same time over the course of a period of time. Performing both concurrently means performing at least a portion of garbage collection and deduplication at the same time while performing a second portion of one of the garbage collection and deduplication processes at a time when the other process is not performed. Performing deduplication and garbage collection asynchronously means performing neither simultaneously or concurrent in time, e.g., performing each at different times that do not depend on when the other is performed.

FIG. 1 shows a system in accordance with one or more embodiments of the invention. The system may include clients (100) that store data in the data management device (110). The clients (100) and data management device (110) may be operably connected to each other. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this. The clients (100) may be other types of computing devices without departing from the invention.

The clients (100) may be programmed to store data in the data management device (110), More specifically, the clients (100) may send data to the data management device (110) for storage and may request data managed by the data management device (110). The data management device (110) may store the data or provide the requested data in response to such requests.

The data management device (110) may be a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 4A-7. The data management device (110) may be other types of computing devices without departing from the invention.

The data management device (110) may include a persistent storage (120) for storing data from the clients (100), a storage manager (151) that manages the persistent storage (120), and a garbage collector (150) for the persistent storage (120). The data management device (110) may store data from the clients (100) in an active storage (130) of the persistent storage (120). Overtime, data stored in the active storage (130) may be migrated to a long term retention (LTR) storage (172) of the persistent storage (120). Each component of the data management device (110) is discussed below.

The data management device (110) may include a persistent storage (120). The persistent storage (120) may include physical storage devices. The physical storage devices may be, for example, hard disk drives, solid state drives, tape drives, or any other type of persistent storage media. The persistent storage (120) may include any number and/or combination of physical storage devices.

The persistent storage (120) may be a distributed storage. In other words, physical storage devices of the persistent storage (120) may be distributed across a number of computing devices. For example, the persistent storage (120) may include four hard disk drives of a first computing device and three solid state drives of a second computing device. Thus, while illustrated as a component of the data management device (110) in FIG. 1A, the persistent storage (120) may including storage resources of any number of computing devices.

The persistent storage (120) may include an active storage (130) and a long term retention storage (172) for storing data from the clients (100). At least a portion of the active storage (130) and/or the long term retention storage (172) may be an object storage. As used herein, an object storage is a data storage architecture that manages data as objects. Each object may include a number of bytes for storing data in the object. In one or more embodiments of the invention, the object storage does not include a file system. Rather, a namespace (125) may be used to organize the data stored in the object storage. For additional details regarding the active storage (130) and the long term retention storage, See FIGS. 1B and 1C, respectively.

The persistent storage (120) may include the namespace (125). The namespace (125) may be a data structure stored on physical storage devices of the persistent storage (120) that organizes the data storage resources of the physical storage devices.

In one or more embodiments of the invention, the namespace (125) may associate a file with a file recipe stored in the persistent storage. The file recipe may be used to generate a file that was previously stored in the data management device (110) by a client. The file recipe may be generated using file segments stored in the active storage (130), the LTR storage (172), or other storage. Each file recipe may include information that enables a number of file segments to be retrieved from the respective storages. The retrieved file segments may be used to generate the file stored in the object storage. For additional details regarding segments of files, See FIGS. 3A, and 3B.

The data management device may include a garbage collector (150). The garbage collector (150) may free storage of the LTR storage (172) that was previously allocated for storage of data received from the clients (100). More specifically, the garbage collector (150) may generate deletion objects that specify objects stored in the LTR storage (172) using data stored in the active storage (130). Once generated, the garbage collector (150) may delete the data stored in the active storage (130) used to generate the deletion object before the objects specified by the generated deletion object are deleted from the LTR storage (172). The garbage collector (150) may operate while the data management device (110) continues to store data from clients.

For additional details regarding objects stored in the active storage (130) and the LTR storage (172), See FIGS. 2A-2G.

In one or more embodiments of the invention, the garbage collector (150) may be a physical device. The physical device may include circuitry. The physical device may be; for example, a field-programmable gate array, application specific integrated circuit, programmable processor, microcontroller, digital signal processor, or other hardware processor. The physical device may be adapted to provide the functionality described in this application and to perform the methods shown in FIGS. 4A-7.

In one or more embodiments of the invention, the garbage collector (150) may be implemented as a processor executing computer instructions, e.g., computer code, stored on a persistent storage that cause the data management device (110) to provide the functionality described throughout this application and to perform the methods shown in FIGS. 4A-7.

The data management device may include a storage manager (151.) The storage manager (151) may store data received from the clients (100). In one or more embodiments of the invention, data received from the clients (100) may be initially stored in the active storage (130). Overtime, the data stored in the active storage (130) may be migrated to the LTR storage (172). The data may be migrated when it meets one or more of the following criteria: (i) the data has been stored in the active storage (130) for a predetermined period of time, (ii) the data is associated with a predetermine client of the clients (100), (iii) the data is of a predetermined type, (iv) the data was received from the clients (100) during a predetermined period of time, or (v) the amount of data stored in the active storage (130) and associated with a particular client exceeds a predetermined amount. The storage manager (151) may migrate data from the active storage (130) to the LTR storage (172) using other criteria without departing from the invention.

In one or more embodiments of the invention, migrating data from the active storage (130) to the LTR storage (172) may change a storage format of the data. For example, data stored in the active storage may have a first type or arrangement and may have a second type or arrangement after being migrated to the LTR storage (172). In one or more embodiments of the invention, the data stored in the LTR storage (172) may be stored at a more granular level when compared to data stored in the active storage (130). For additional details the different formats data stored in the active storage (130) and the LTR storage (172), See FIGS. 2A, 2B, and 2E.

In one or more embodiments of the invention, the storage manager (151) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described in this application.

In one or more embodiments of the invention, the storage manager (151) may be implemented as a processor executing computer instructions, e.g., computer code, stored on a persistent storage that causes the data management device (110) to provide the functionality described throughout this application.

As discussed above, data may be initially stored in the active storage (130) and migrated to the LTR storage (172). Storing the data in either storage may result in the storage of meta-data objects regarding the stored data. The generated meta-data objects may be stored in the active storage (130). In one or more embodiments of the invention, the meta-data objects are not stored in the LTR storage (172) regardless of where the data is stored. In other words, when data is stored in the LTR storage or the active storage, corresponding meta-data may be stored only in the active storage.

The data and associated meta-data may be stored in different types of objects. FIGS. 1B and 1C show diagrams of the active storage (130) and LTR storage (172).

More specifically, FIG. 1B shows a diagram of an active storage (130) in accordance with one or more embodiments of the invention. As used herein, an active storage (130) refers to a storage in a multi-storage system where data received from clients is initially stored upon receipt of the data from the clients. The active storage (130) may include one or more separate storage architectures. For example, the active storage (130) may include an object storage (131), that stores data in the form of objects, and a file system based storage, such as for example NTFS, that stores data using a file system. The active storage (130) may include any number of storage architectures without departing from the invention, Each of these storage architectures may include different types of data structures.

The object storage (131) of the active storage (130) may include any number of objects. As used herein, an object of an object storage may be a data structure that includes a number of bytes addressable via an identifier that uniquely identifies the object from all other objects stored in the object storage. Each of the objects of the object storage (131) may include a similar number of bytes. For example, each object may include between 4.9 and 5.1 megabytes with an average size of 5 megabytes. The objects of the object storage (131) may store different types of information. Data of a specified type may be aggregated and stored in a type of object structure to efficiently store that type of data.

Figure 1B:
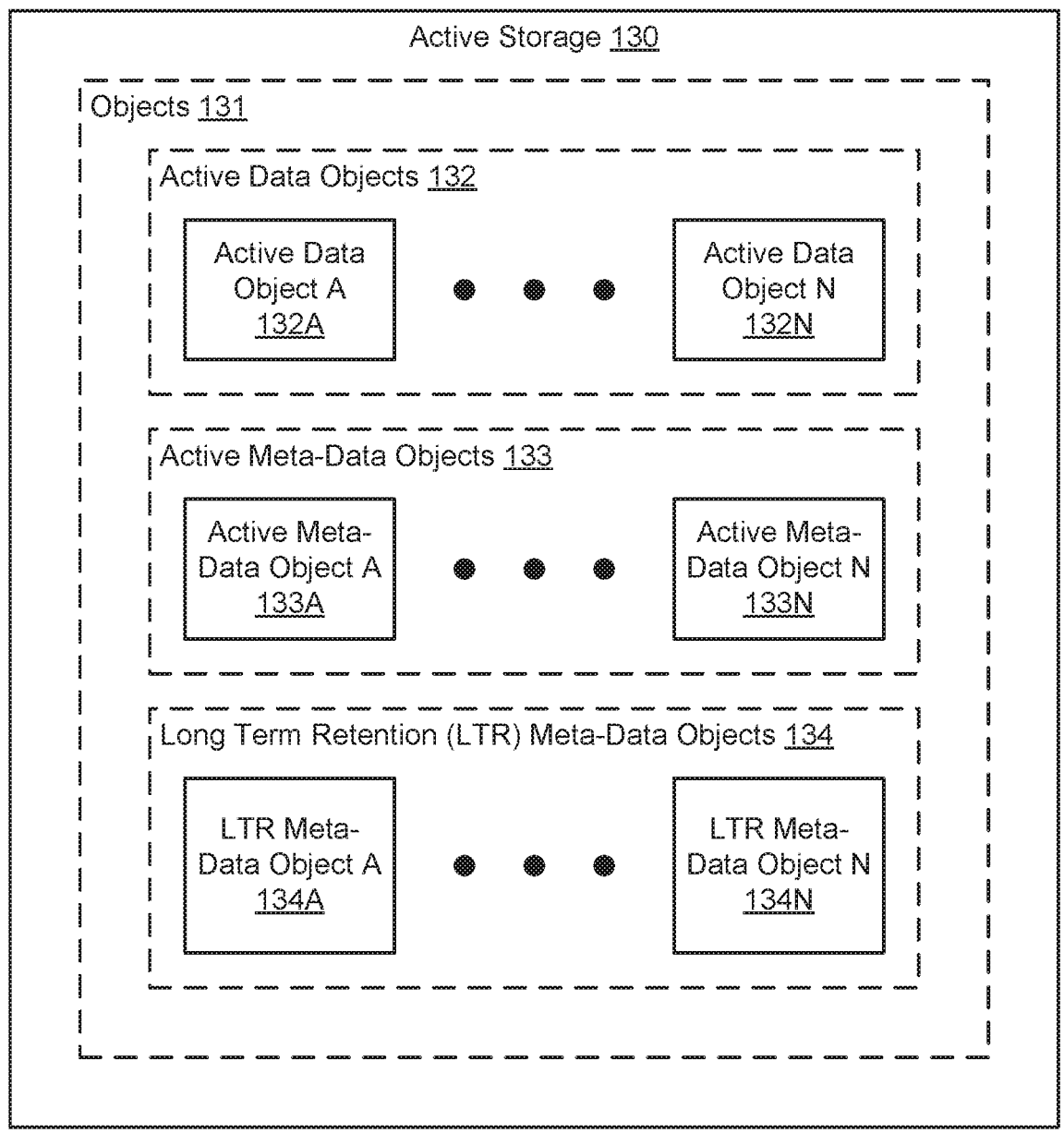
FIG. 1B shows a diagram of an active storage in accordance with one or more embodiments of the invention.
Figure 1C:
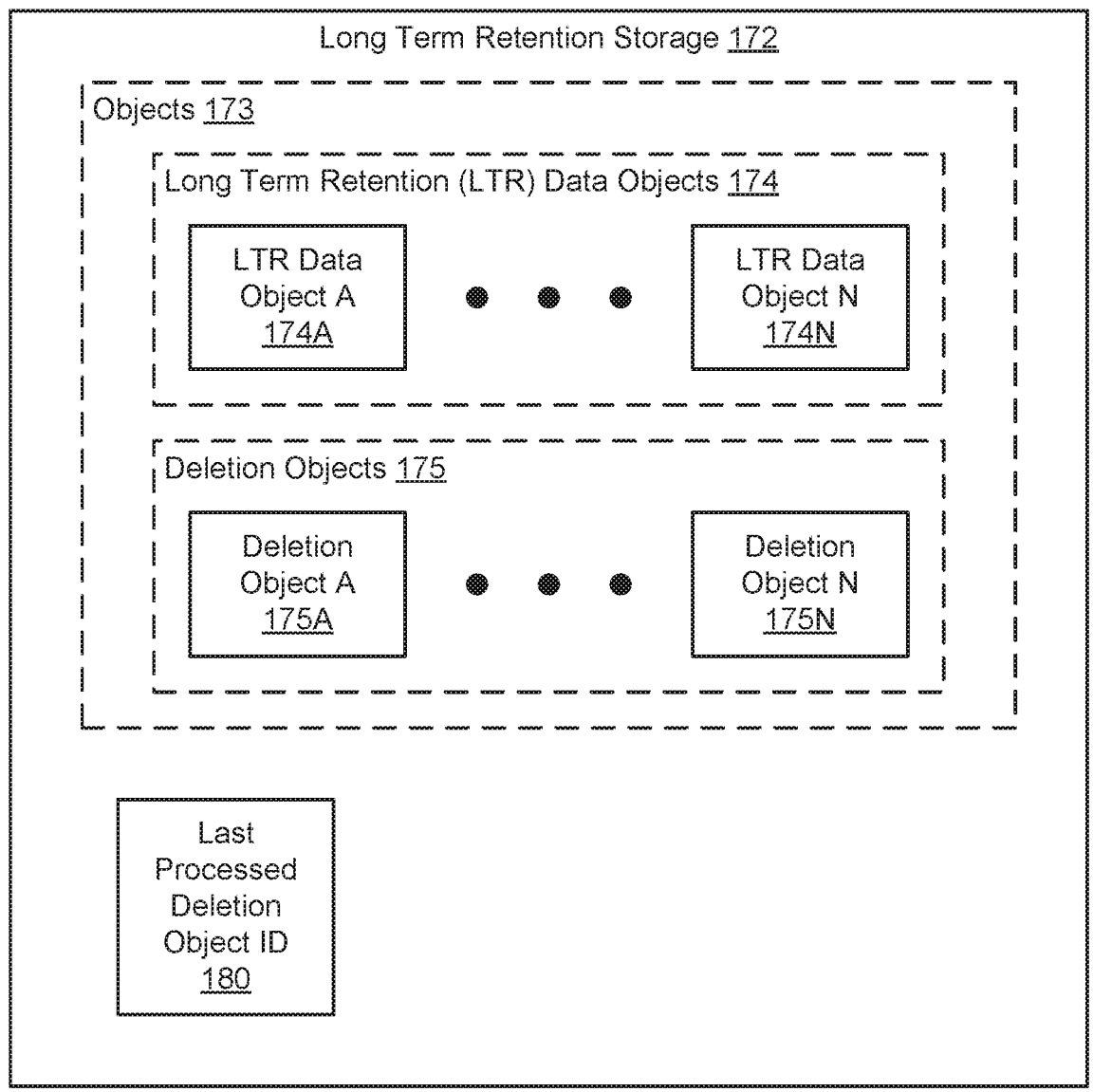
FIG. 1C shows a diagram of a long term retention (LTR) storage in accordance with one or more embodiments of the invention.

The object storage includes active data objects (132) that store segments of data stored in the object storage of the active storage, active meta-data objects (133) that store meta-data regarding the segments stored in the active data objects (132), and LTR meta-data objects (134) that store meta-data regarding segments of data stored in the LTR storage (172, FIG. 1A). For additional information regarding the aforementioned objects, See FIGS. 2A, 2B, and 2C. The object storage may include other types of objects without departing from the invention.

While the objects of the object storage shown in FIG. 1B are illustrated as being grouped by the type of object, in one or more embodiments of the invention the different types of objects are not grouped. For example, as different types of objects are generated and stored in the object storage of the active storage (130), the objects may be given sequential numbered identifiers and stored adjacent to/grouped with different types of objects. Additionally, as objects are deleted, other objects may be stored in place of the deleted objects resulting in a random distribution of types of objects throughout the object storage.

Additionally, in one or more embodiments of the invention, identifiers of objects are monotonically assigned in increasing value. In other words, each time an object is stored in the object storage of the active storage, the stored object is assigned an identifier having a numerical value that is one greater than the value of the identifier assigned to the object that was previously stored in the object storage.

Further, the active storage (130) may store other types of information than that illustrated in FIG. 1B without departing from the invention. The active storage (130) may include different types of objects, data structures, or information.

FIG. 1C shows a diagram of a LTR storage (172) in accordance with one or more embodiments of the invention. As used herein, a LTR storage (172) refers to a storage in a multi-storage system where data is stored for long term retention. For example, data that is stored in the active storage (130, FIG. 1A) may be migrated to the LTR storage (172) for long term storage after it has been stored in the active storage for a predetermined period of time. The predetermined period of time may be, for example, 30 days. Migrating data to other storage tiers may make deduplication of data stored to the active storage (130) more efficient by reducing the amount of data against which the data from the clients is deduplicated against. The computational/input-output cost of deduplicating data may be proportional to the amount of data against which the data is deduplicated.

Similar to the active storage (130), the LTR storage (172) may include one or more separate storage architectures. For example, the LTR storage (172) may include an object storage (173), that stores data in the form of objects, and a file system based storage, such as for example NITS. The LTR storage (172) may include any number of storage architectures without departing from the invention.

The object storage (173) of the LTR storage (172) may be similar to the object storage of the active storage but may store different types of information and utilizes different types of data structures, e.g., objects.

The object storage (173) may include LTR data objects (174) that store segments of data stored in the object storage (173) of the LTR storage (172). The object storage (173) may also store deletion objects (175) that are used to delete objects of the LIR storage (172) while continuing to deduplicate data from clients. For additional information regarding the aforementioned objects, See FIGS. 2E and 2F. The object storage (173) may include other types of Objects without departing from the invention.

In addition to storing Objects, the LTR storage (172) may also store a last processed deletion object identifier (180). The last processed deletion object identifier (180) may specify an identifier of a deletion object (175) that was last processed to completion, in some cases, the processing of a deletion object may be interrupted. The last processed deletion object identifier (180) may be used to identify deletion objects (175) that have or have not yet been fully processed.

While the objects of the object storage (173) shown in FIG. 1C are illustrated as being grouped by the type of object, in one or more embodiments of the invention the different types of objects are not grouped. For example, as different types of objects are generated and stored in the object storage (173) of the LTR storage (172), the objects may be given sequential identifiers and stored next to different types of objects. Additionally, as objects are deleted, other objects may be stored in place of the deleted objects resulting in a random distribution of types of objects throughout the object storage.

Additionally, the LTR storage (172) may store other types of information than that illustrated in FIG. 1C without departing from the invention. The LTR storage (172) may include different types of objects, data structures, or information.

As discussed above, the active storage (130) and LTR storage (172) may include object storages that store different types of objects. FIGS. 2A, 2B, 2C, 2E, and 2F show different types of object in accordance with one or more embodiments of the invention.

Figure 2A:
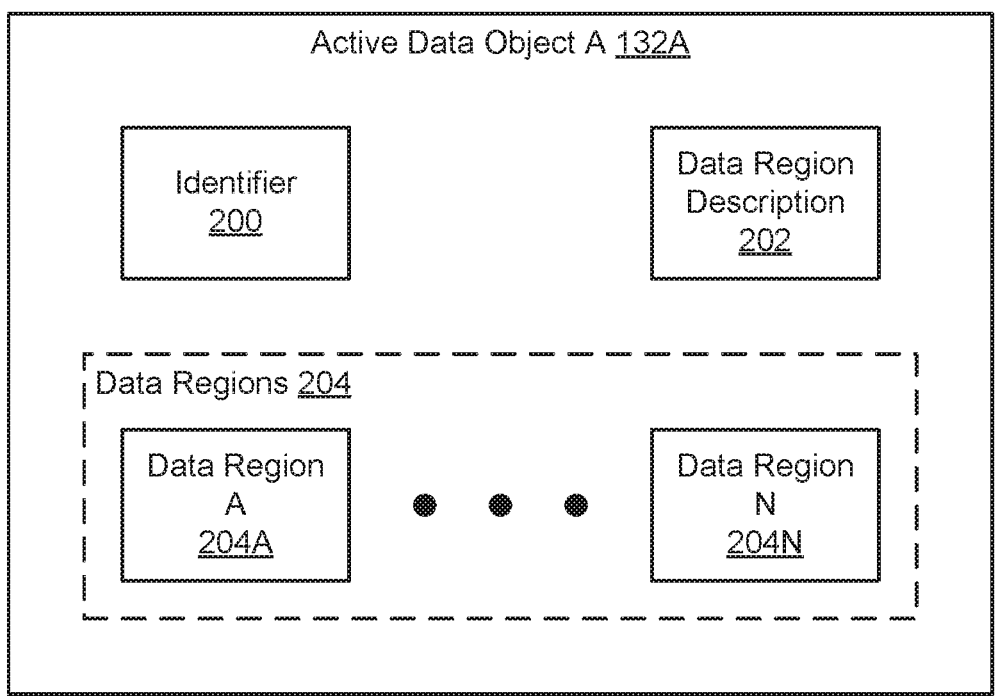
FIG. 2A shows a diagram of an example active data object in accordance with one or more embodiments of the invention.

FIG. 2A shows an example of an active data object A (132A). The active data object A (132A) may be a data structure for storing segments of data. The active data object A (132B) may include an identifier (200) that uniquely identifies the object, a data region description (202) that includes information regarding the structure of the data regions (204), and the data regions (204) that include a number of regions for storing segments.

The identifier (200) may be a name, bit sequence, or other information used to identify the data object. The identifier (200) may uniquely identify the data from the other objects of the object storage in which the active data object is stored.

The data region description (202) may include description information regarding the structure of the data regions (204). The data region description (202) may include information that enables file segments stored in the data regions (204) to be read. The data region description (202) may include, for example, information that specifies the start of each data region (204A-204N), the length of each region, and/or the start/end of segments stored in the region. The data region description (202) may include other information without departing from the invention.

The data regions (204) may include any number of data regions (204A-204N), Each data region (204A-204N) may include any number of segments. The data regions (204) may be compressed. The compression of the data regions (204) may be a lossless compression.

Figure 2B:
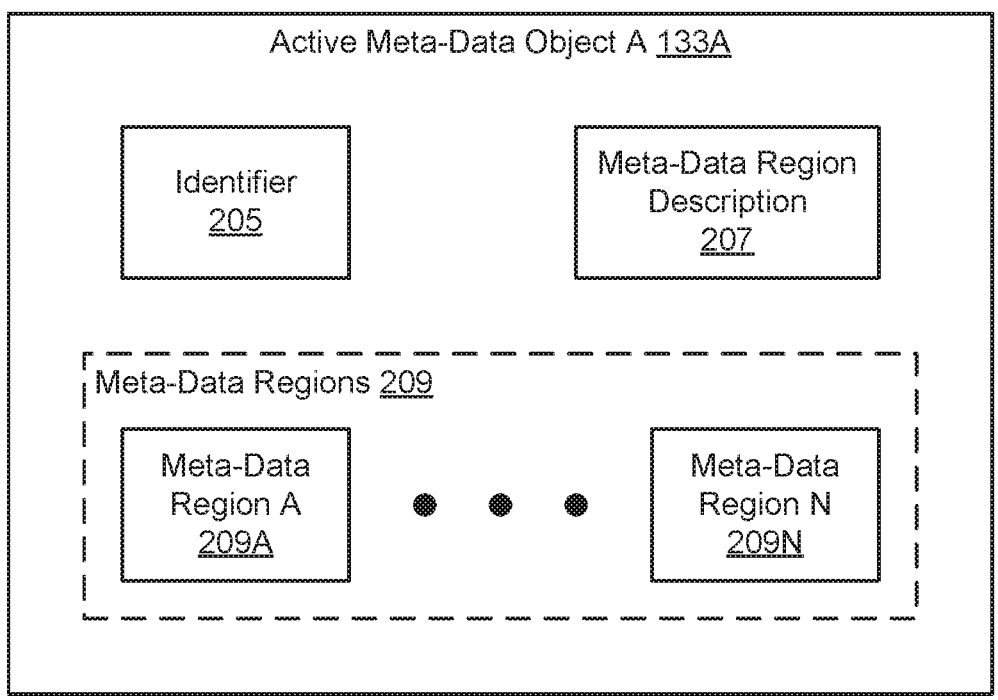
FIG. 2B shows a diagram of an example active meta-data object in accordance with one or more embodiments of the invention.

FIG. 2B shows an example of an active meta-data object A (133A). The active meta-data object A (133A) may be a data structure for storing met-data associated with segments of data stored in active data objects. The active meta-data object A (133A) may include an identifier (205) that uniquely identities the object, a meta-data region description (207) that includes information regarding the structure of the meta-data regions (209), and the meta-data regions (204) that include a number of regions for storing meta-data associated with segments.

The identifier (205) may be a name, bit sequence, or other information used to identify the data object. The identifier (205) may uniquely identify the data from the other Objects of the object storage in which the active data object is stored.

The meta-data region description (207) may include description information regarding the structure of the meta-data regions (209). The meta-data region description (207) may include information that enables meta-data stored in the meta-data regions (209) to be read. The meta-data region description (207) may include, for example, information that specifies the start of each meta-data region (209A-209N), the length of each region, and/or the start/end of meta-data stored in the region. The meta-data region description (207) may include other information without departing from the invention.

Figure 2C:
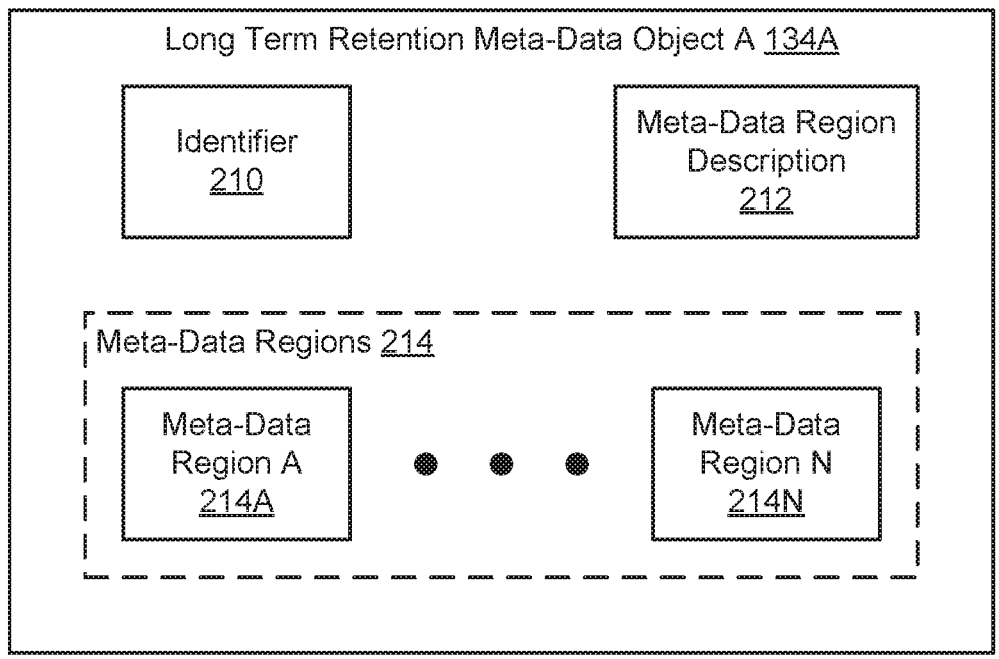
FIG. 2C shows a diagram of an example LTR meta-data object in accordance with one or more embodiments of the invention.
Figure 2D:
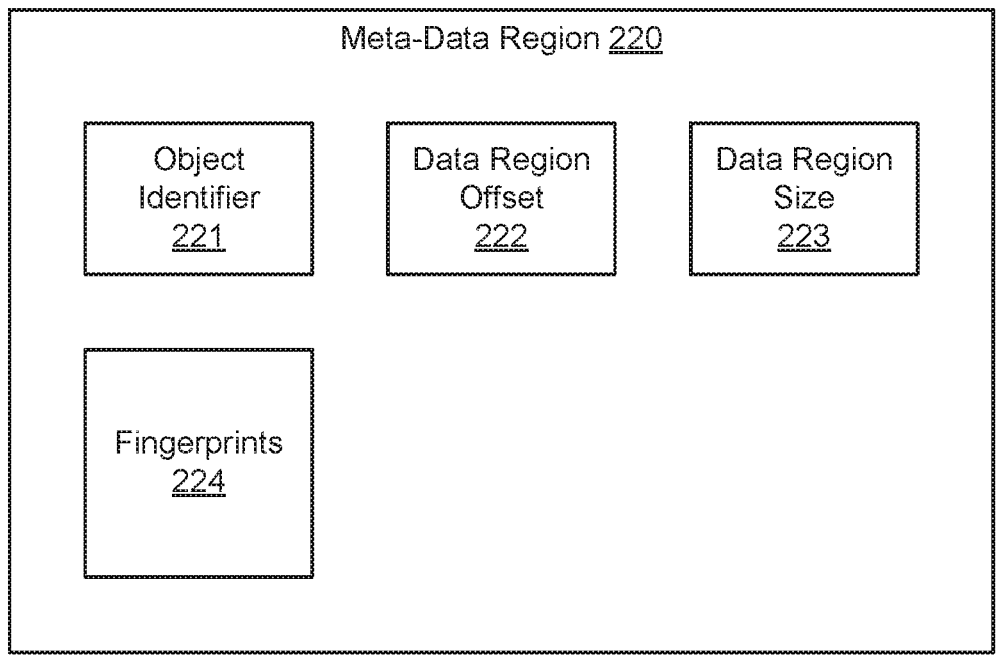
FIG. 2D shows a diagram of an example meta-data region in accordance with one or more embodiments of the invention.

The meta-data regions (209) may include any number of meta-data regions (209A-209N). Each region may be associated with an active data object. Each meta-data region (209A-209N) may include meta-data associated with the segments stored in the associated active data object. For additional details regarding the meta-data stored in the meta-data regions (209A-209N), See FIG. 2D, FIG. 2C shows an example of a LTR meta-data object A (134A). The meta-data object A (134A) may be a data structure for storing meta-data associated with segments of data stored in LTR data objects of the LTR storage. The meta-data object A (134A) may have a structure similar to that of the active meta-data objects.

As discussed above, the active meta-data objects and LTR meta-data objects may include meta-data regions. FIG. 2D shows an example of a meta-data region (220). The example meta-data region (220) includes an object identifier (221) that specifies an identifier of an object includes the segments associated with the meta-data of the meta-data region (220), a data region offset (222) and data region size (223) used to access the segments associated with the meta-data of the meta-data region (220), and fingerprints (224). The fingerprints (224) may be the fingerprints of the segments associated with the meta-data of the meta-data region (220).

The meta-data region (220) may include other meta-data without departing from the invention. For example, in one or more embodiments of the invention, a meta-data region may include information that enables a number of objects to be identified that include intermediate tree information that specifies a portion of a segment tree. The segment tree may be a data structure used to organize segments stored in the object storage. The segment tree may be used to retrieve a number of segments that are used to generate a file stored in the object storage. In some embodiments of the invention, multiple meta-data regions may store segment tree information of a single segment tree.

Figure 2E:
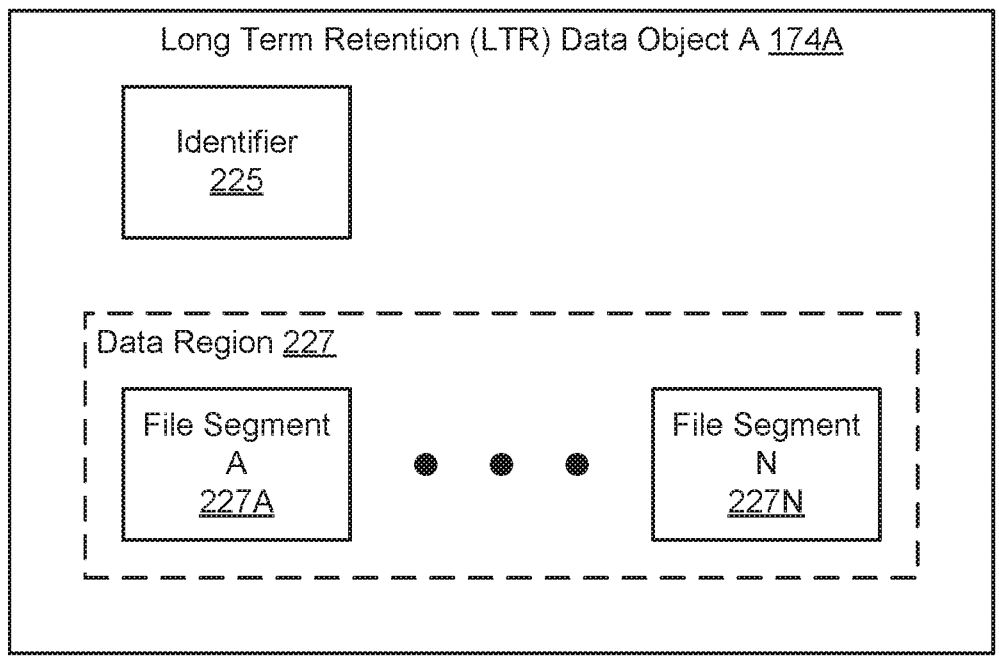
FIG. 2E shows a diagram of an example LTR data object accordance with one or more embodiments of the invention.

FIG. 2E shows an example of a LTR data object A (174A), The LTR data object A (174A) may be a data structure for storing segments of data stored in LTR data objects. The LTR data object A (174A) may include an identifier (225) that uniquely, identifies the object and a data region (227) that includes a number of segments (227A-227N). The data region (227) may be compressed.

In one or more embodiments of the invention, each LTR data object may be associated with a logical data object (not shown). Each logical data object may be associated with multiple LTR data objects. As seen from FIG. 2E, LTR data object in one or more embodiments of the invention only include a single data region. In contrast, active data object may include multiple data regions. Thus, each active data object may include more data than a LTR data object. Associating multiple LTR data objects with a logical data object may assist in organizing the LTR data objects.

In one or more embodiments of the invention, a logical data object may be functionally similar to an active data object while storing the data regions and enabling access to the data regions at a more granular level than an active data object.

Figure 2F:
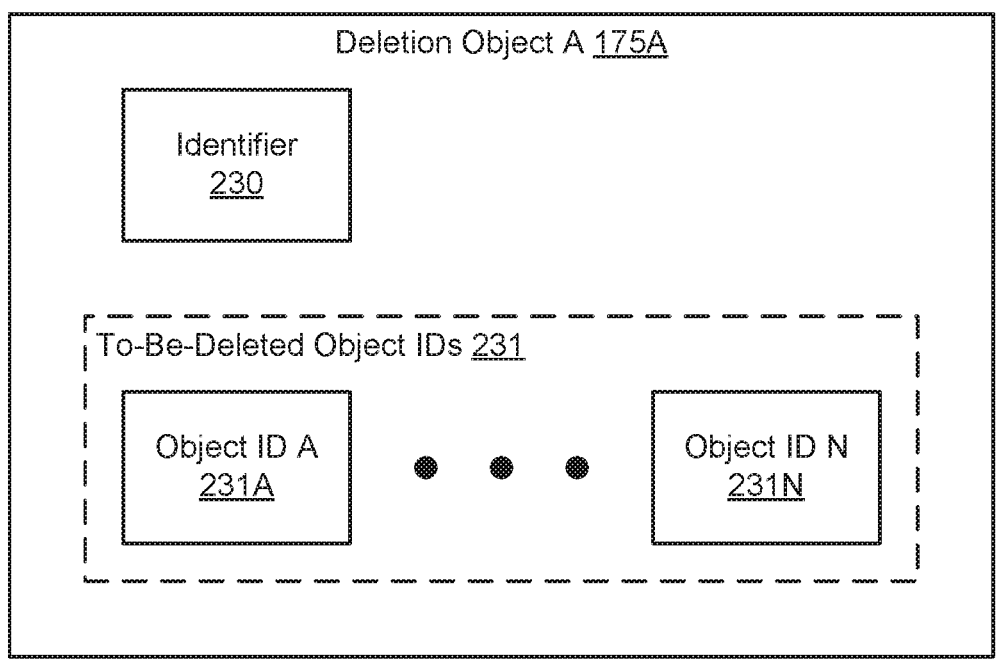
FIG. 2F shows a diagram of an example deletion object in accordance with one or more embodiments of the invention.

FIG. 2F shows an example of a deletion object A (175A). The deletion object A (175A) may be a data structure for storing identifiers LTR data objects that are to be deleted. The deletion object A (175A) may include an identifier (230) that uniquely identifies the object and to-be-deleted object IDs (231). The to-be-deleted object Ds (231) may include any number of identifiers of LTR data objects.

As discussed above, the meta-data stored in meta-data objects may include fingerprints of segments. As used herein, a fingerprint of a segment may be a bit sequence that virtually uniquely identifies the segment from other segments stored in the object storage. As used herein, virtually uniquely means that the probability of collision between each fingerprint of two segments that include different data is negligible, compared to the probability of other unavoidable causes of fatal errors. In one or more embodiments of the invention, the probability is $10^{\wedge}-20$ or less, in one or more embodiments of the invention, the unavoidable fatal error may be caused by a force of nature such as, for example, a tornado. In other words, the fingerprint of any, two file segments that specify different data will virtually always be different.

Fingerprints of the segments stored in the object storage of the active storage may, be used to deduplicate segments of data before storing the segments of the data. For example, fingerprints of segments may be compared to fingerprints, stored as meta-data; of segments already stored. To further clarify the relationships between files of data, segments, and fingerprints, FIGS. 2G, 3A, and 3B include graphical representations of the relationships.

Figure 2G:
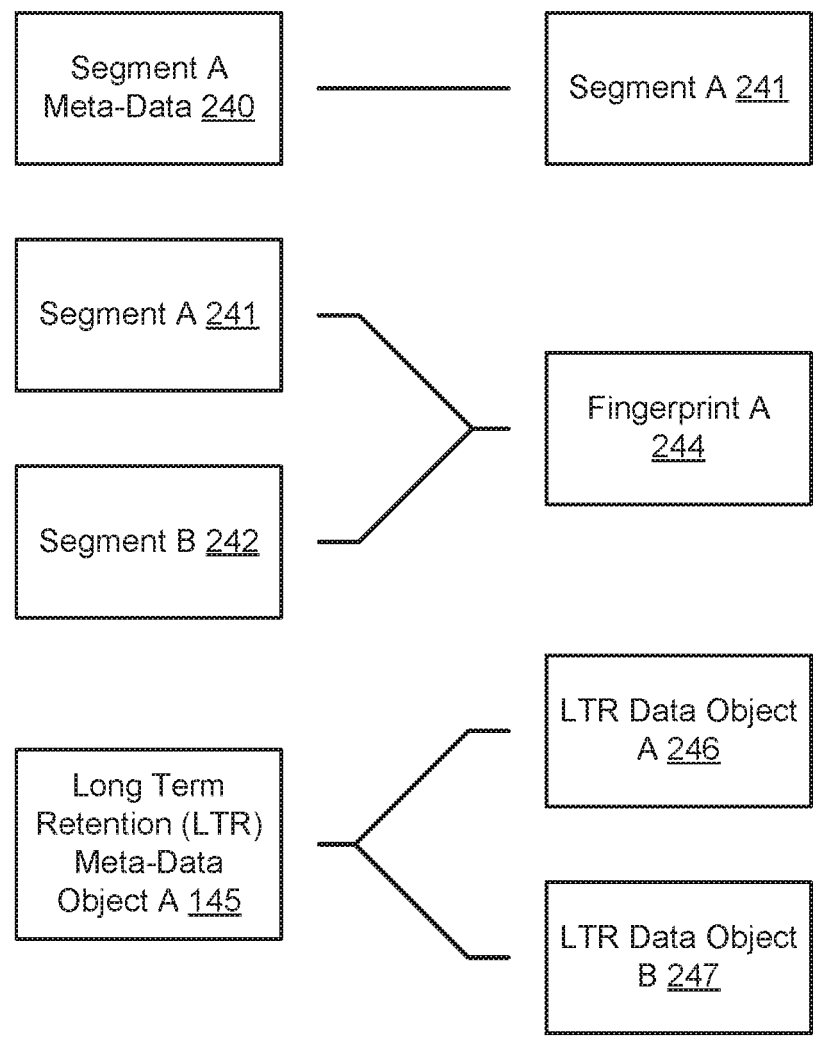
FIG. 2G shows a diagram of system relationships in accordance with one or more embodiments of the invention.

More specifically, FIG. 2G shows a relationship diagram that illustrate relationships between segments, meta-data associated with the segments, and the objects in which the meta-data and segments are stored in accordance with one or more embodiments of the invention.

As seen from the diagram, there is a one to one relationship between meta-data regarding a segment (240) and the segment (241). In other words, meta-data of a segment may only be stored in a single location. The meta-data may be stored in the active storage and the associated segment may be stored in the active storage or the LTR storage.

Additionally, as seen from FIG. 2D, there is a one to many relationship between segments and fingerprints. More specifically, segment of different files, or the same file, may have the same fingerprint. For example, a file segment A (241) of a first file and a file segment B (242) of a second file may have the same fingerprint A (244) if both include the same data. The system may not store both segments by deduplicating the segments.

Further, a meta-data object (145) may include meta-data associated with segments stored in multiple data objects (246, 247). In other words, the meta-data from multiple data objects may be aggregated and stored in a single meta-data object (145).

Figure 3A:
FIG. 3A shows a diagram of a file in accordance with one or more embodiments of the invention.

FIG. 3A shows a diagram of a file (300) in accordance with one or more embodiments of the invention. The file (300) may include data. The data may be any type of data, may be in any format, and of any length.

Figure 3B:
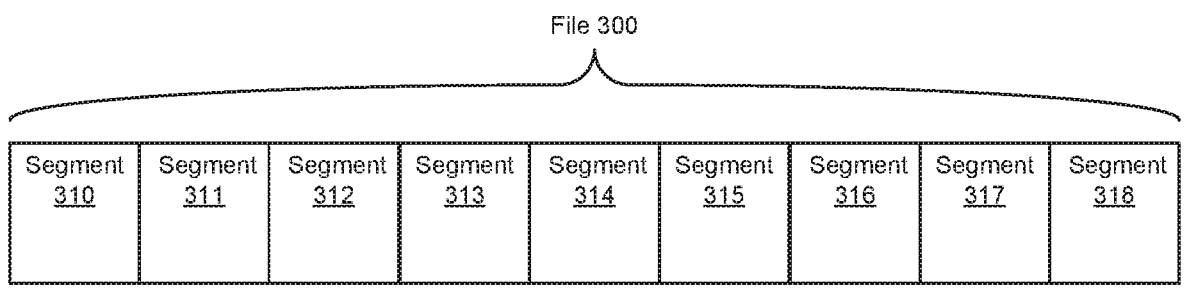
FIG. 3B shows a diagram of a relationship between segments of a file and the file in accordance with one or more embodiments of the invention.

FIG. 3B shows a diagram of segments (310-318) of the file (300) of the data. Each segment may include separate, distinct portions of the file (300). Each of the segments may be of different, but similar lengths. For example, each segment may include approximately 8 kilobytes of data, e.g., a first segment may include 8.03 kilobytes of data, the second segment may include 7.96 kilobytes of data, etc. In one or more embodiments of the invention, the average amount of data of each segment is between 7.95 and 8.05 kilobytes.

As discussed above, the data management device (110, FIG. 1A) may store data from clients (100, FIG. 1A). The clients may request that the data be deleted. Since the stored data is deduplicated, a segment may be used to generate multiple different files. Thus, determining when a segment can be deleted without impacting the system's ability to provide all of the files previously stored can be computationally/input-output expensive. In one or more embodiments of the invention, the data management device may perform garbage collection of data while storing data.

Figure 4A:
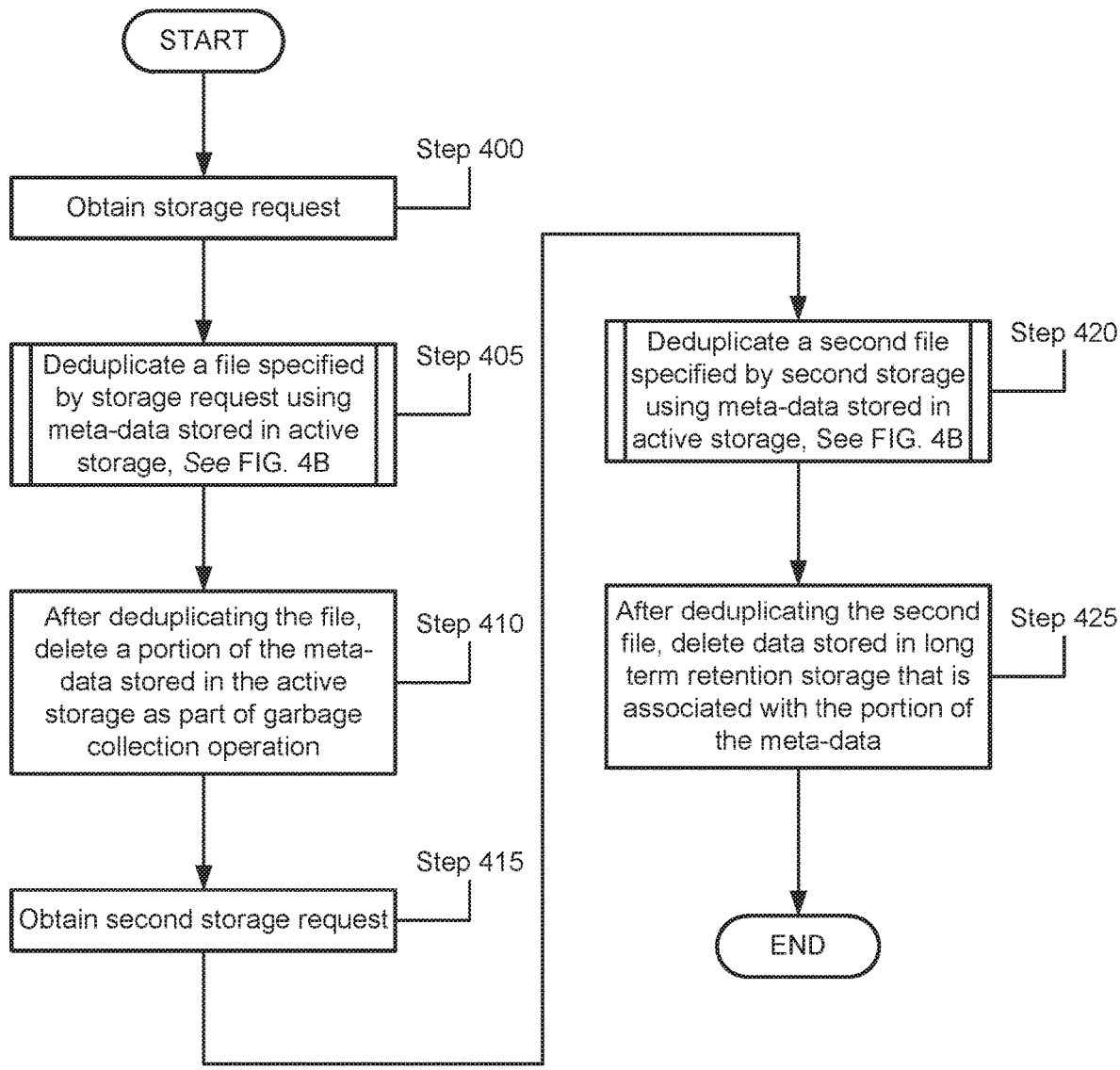
FIG. 4A shows a flowchart of a method of operating a data management device in accordance with one or more embodiments of the invention.

FIG. 4A shows a flowchart of a method in accordance with one or more embodiments of the invention. The method depicted in FIG. 4A may be used to store data while performing garbage collection in accordance with one or more embodiments of the invention. The method shown in FIG. 4A may be performed by, for example, a garbage collector (150, FIG. 1A). Other component of the data management device (110) or the illustrated system may perform the method illustrated in FIG. 4A without departing from the invention.

In Step 400, a storage request is obtained. The storage request may be for storing a file in the data management device. The request may be received from a client. The storage request may be received while the data management device is performing garbage collection of previously identified to-be-deleted segments.

In Step 405, the file specified by the storage request is deduplicated using meta-data stored in an active storage of the data management device while the garbage collection is being performed. The file may be deduplicated using the method illustrated in FIG. 4B. The garbage collection may be performed by the method illustrated in FIG. 5A. The file may be deduplicated using other methods without departing from the invention.

In Step 410, a portion of the meta-data stored in the active storage is deleted as part of a garbage collection operation after the file is deduplicated.

In Step 415, a second storage request is obtained. The second storage request may be obtained from a client. The second storage request may specify a second file.

In Step 420, the second file specified by the second storage is deduplicated using the meta-data stored in the active storage after a portion of the meta-data is deleted in Step 410. The file may be deduplicated using the method illustrated in FIG. 4B.

In Step 425, the data that is associated with the portion of the meta-data is deleted from the LTR storage after deduplicating the second file as part of the garbage collection process.

The method may end after Step 425.

Thus, the method illustrated in FIG. 4A enables data to be deleted while continuing to store data from clients. The method includes deleting meta-data from the active storage and then deleting the associated segments stored in the LTR storage at a different point in time. Since the deduplication is performed using only the meta-data, removing the segments associated with the meta-data at a later time enables the data management device to continuously deduplicate data while freeing up space when input-output capacity of the LTR storage is available.

Figure 4B:
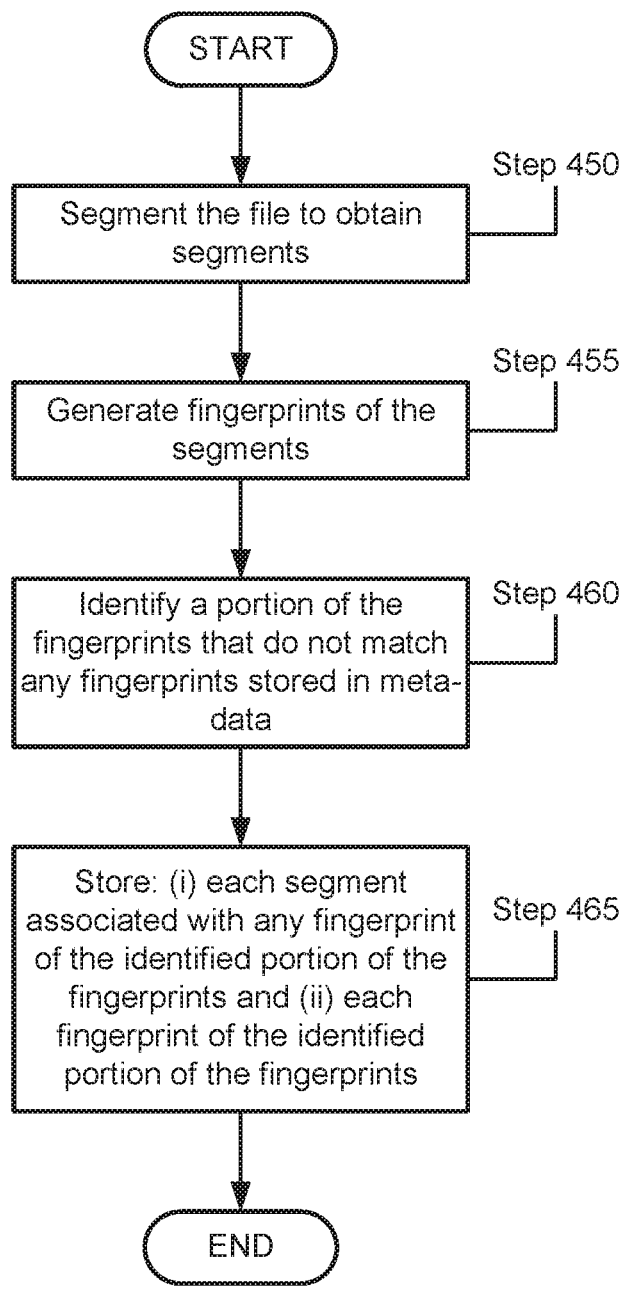
FIG. 4B shows a flowchart of a method of deduplicating data in accordance with one or more embodiments of the invention.

FIG. 4B shows a flowchart of a method in accordance with one or more embodiments of the invention. The method depicted in FIG. 4B may be used to deduplicate data while performing garbage collection in accordance with one or more embodiments of the invention. The method shown in FIG. 4B may be performed by, for example, a storage manager (151, FIG. 1A). Other component of the data management device (110) or the illustrated system may perform the method illustrated in FIG. 4B without departing from the invention.

In Step 450, segments of a file to-be-stored are obtained. The segments may be obtained by dividing the to-be-stored file into segments.

In Step 455, fingerprints of each of the segments may be generated. The fingerprint of each segment may be generated by obtaining a hash of each segment. The hash may be obtained by a hash function. The hash function may be SHA-1.

In Step 460, a portion of the fingerprints that do not match a set of fingerprints stored in the active storage may be identified. The set of fingerprints may include a portion of the fingerprints stored in meta-data associated with segments stored in the active storage of the LTR storage.

In Step 465, each segment associated with any fingerprint of the identified portion of the fingerprints is stored in the LTR storage and each fingerprint of the identified portion of the fingerprints are stored in the active storage. More specifically, the segments are stored in LTR data objects and the fingerprints are stored in LTR meta-data objects.

The method may end following Step 465.

Figure 5A:
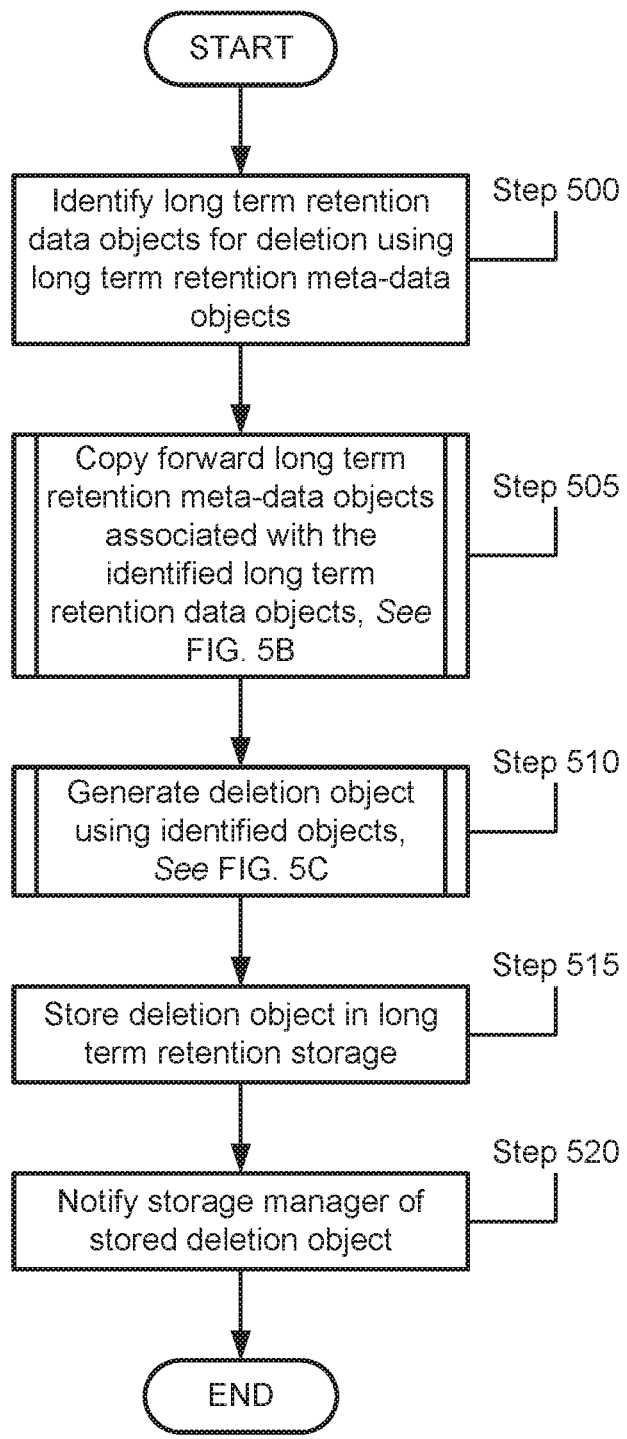
FIG. 5A shows a flowchart of a method of performing garbage collection on an active storage of a persistent storage in accordance with one or more embodiments of the invention.

FIG. 5A shows a flowchart of a method in accordance with one or more embodiments of the invention. The method depicted in FIG. 5A may be used to deduplicate data while performing garbage collection in accordance with one or more embodiments of the invention. The method shown in FIG. 5A may be performed by, for example, a garbage collector (150, FIG. 1A). Other component of the data management device (110) or the illustrated system may perform the method illustrated in FIG. 5A without departing from the invention.

In Step 500, long term retention data objects for deletion are identified using long term retention meta-data objects. In one or more embodiments of the invention, the LTR meta-data objects may be used to determine whether segments stored in LTR data objects may be deleted. The LTR data objects may be identified using any method for identifying segments that are no longer necessary without departing from the invention.

In Step 505, the LTR meta-data objects associated with the LTR data objects are copied forward. As used herein, copy forward means to copy the meta-data of the LTR meta-data objects that is not associated with any LTR data object that has been identified for deletion to a new LTR meta-data object and then delete the LTR meta-data object from which the meta-data was copied. LTR meta-data objects may include meta-data associated with an LTR data object that has been identified for deletion and meta-data associated with an LTR data object that has not been identified for deletion. Copying forward LTR meta-data objects may be performed using the method shown in FIG. 5B. Copying forward LTR meta-data Objects may be performed using other methods without departing from the invention.

In Step 510, a deletion object is generated using the LTR data objects identified for deletion. The deletion object may be generated using the method shown in FIG. 5C. The deletion object may be generated using other methods without departing from the invention.

In Step 515, the generated deletion object is stored in the LTR storage.

In Step 520, the storage manager is notified of the deletion object stored in the LTR storage.

The method may end following Step 520.

Figure 5B:
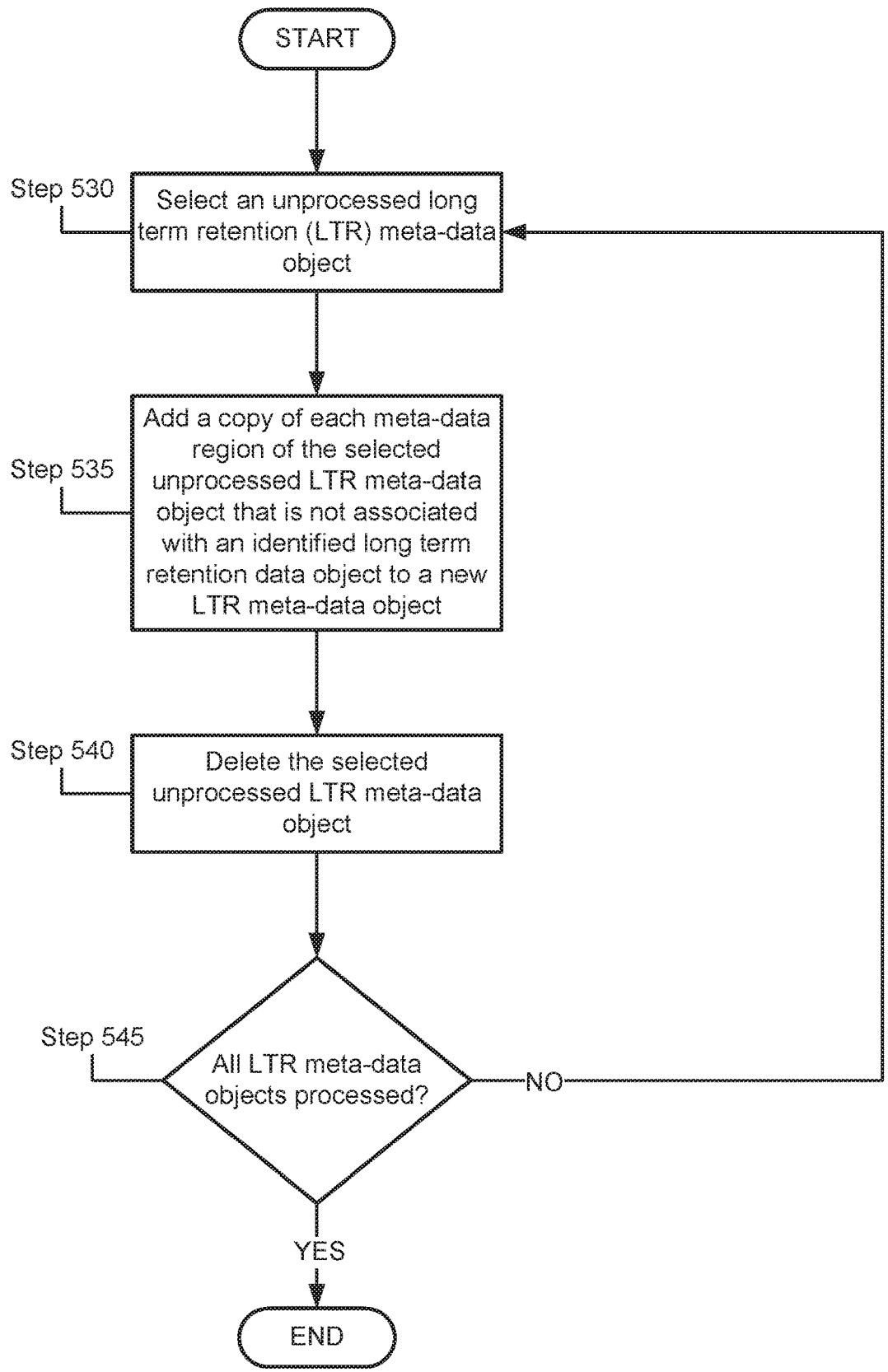
FIG. 5B shows a flowchart of a method of copying forward meta-data while performing garbage collection on an active storage of a persistent storage in accordance with one or more embodiments of the invention.

FIG. 5B shows a flowchart of a method in accordance with one or more embodiments of the invention. The method depicted in FIG. 5B may be used to copy forward meta-data objects in accordance with one or more embodiments of the invention. The method shown in FIG. 5B may be performed by, for example, a garbage collector (150, FIG. 1A). Other component of the data management device (110) or the illustrated system may perform the method illustrated in FIG. 5B without departing from the invention.

In Step 530, an unprocessed LTR meta-data object is selected. At the start of the method illustrated in FIG. 530, all LTR meta-data object storing meta-data associated with segments stored in LTR data objects that have been identified for deletion may be considered to be unprocessed LTR meta-data objects.

In Step 535, a copy of each meta-data region of the selected unprocessed LTR meta-data object that is not associated with a LTR data object identified for deletion is added to a new LTR meta-data object.

In Step 540, the selected unprocessed LTR meta-data object is deleted.

In Step 545, it is determined whether all of the LTR meta-data objects have been processed. If all of the LTR meta-data objects have been processed, the method may end following Step 545. If all of the LTR meta-data objects have not been processed, the method proceeds to Step 530.

Figure 5C:
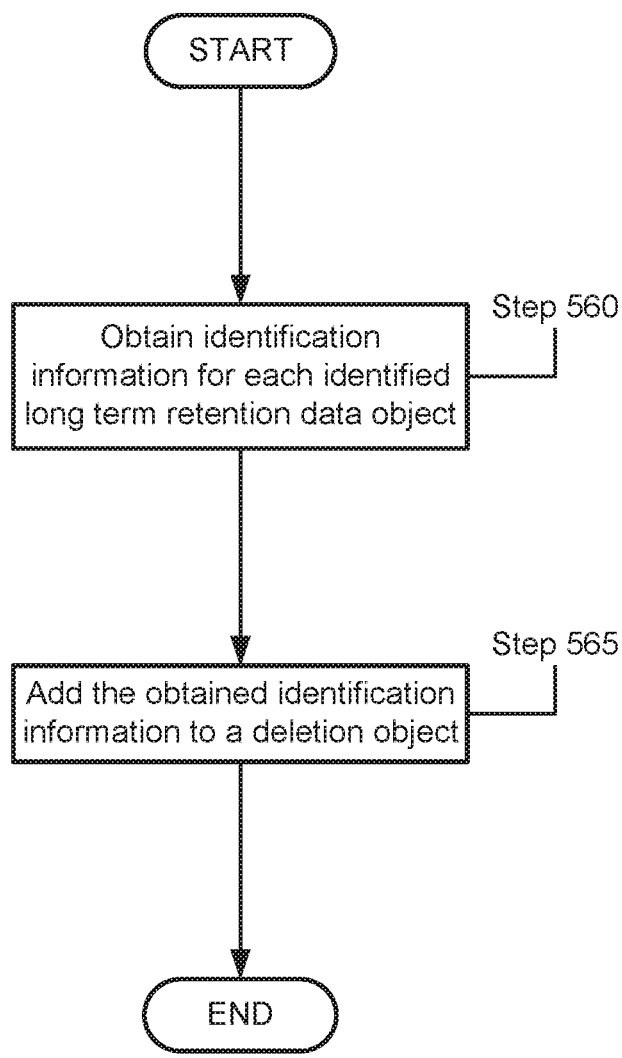
FIG. 5C shows a flowchart of a method of generating a deletion object while performing garbage collection on an active storage of a persistent storage in accordance with one or more embodiments of the invention.

FIG. 5C shows a flowchart of a method in accordance with one or more embodiments of the invention. The method depicted in FIG. 5C may be used to generate a deletion object in accordance with one or more embodiments of the invention. The method shown in FIG. 5C may be performed by, for example, a garbage collector (150, FIG. 1A). Other component of the data management device (110) or the illustrated system may perform the method illustrated in FIG. 5C without departing from the invention.

In Step 560, identification information for each LTR data object identified for deletion is obtained. The identification information may be an identifier of each object. For example, the identifier may be the identifier assigned to each object when it is created and stored in the object storage of the LTR storage.

In Step 565, the obtained identification information is added to the LTR deletion object.

In one or more embodiments of the invention, a type may be assigned to the object to identify it as a deletion object. The type may be assigned by adding a predetermined byte sequence to the deletion object. The predetermined byte sequence may distinguish the object as a deletion object from type of Objects such as, for example, LTR data objects.

The method may end following Step 565.

Figure 6A:
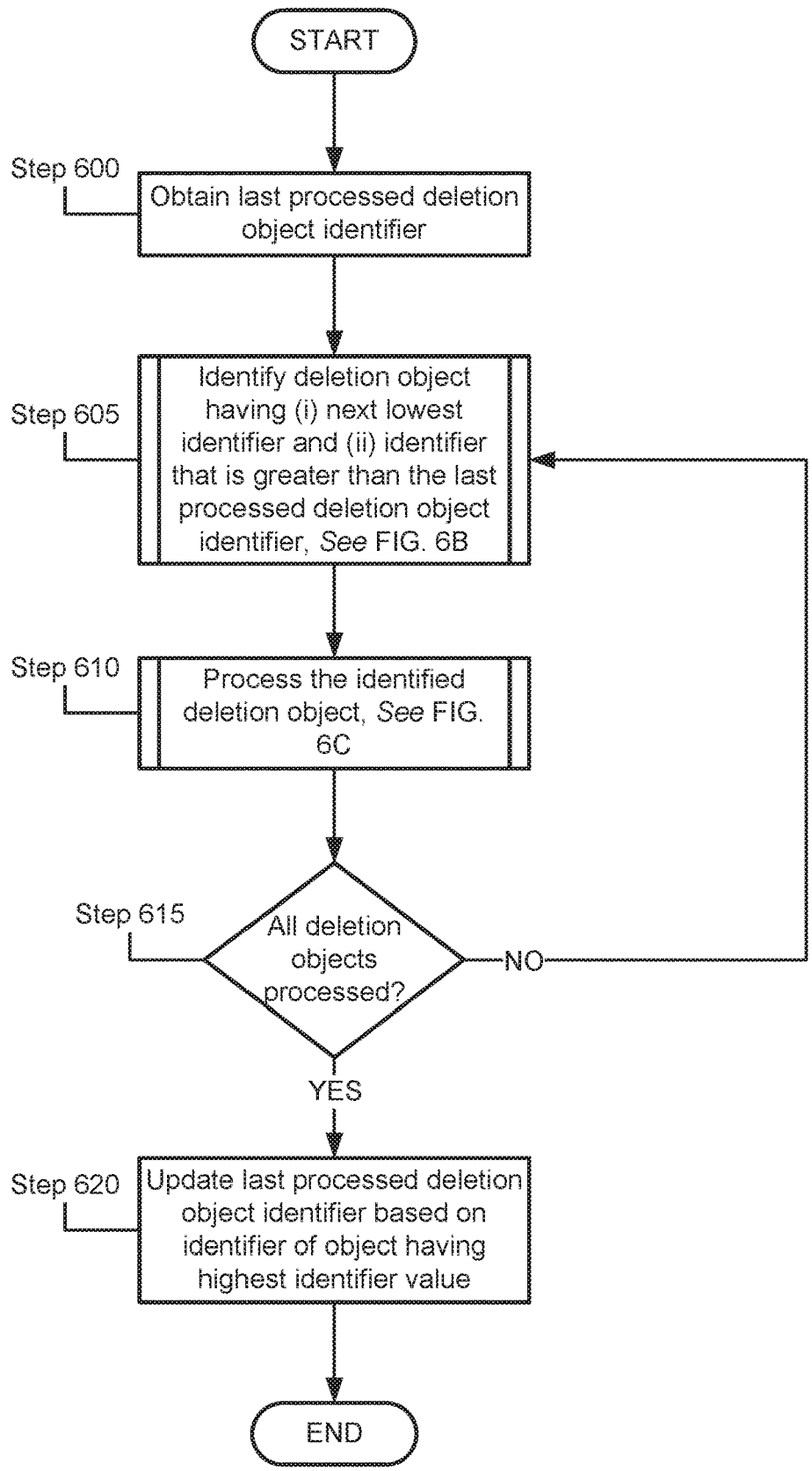
FIG. 6A shows a flowchart of a method of performing garbage collection on a LTR storage of a persistent storage in accordance with one or more embodiments of the invention.
Figure 6B:
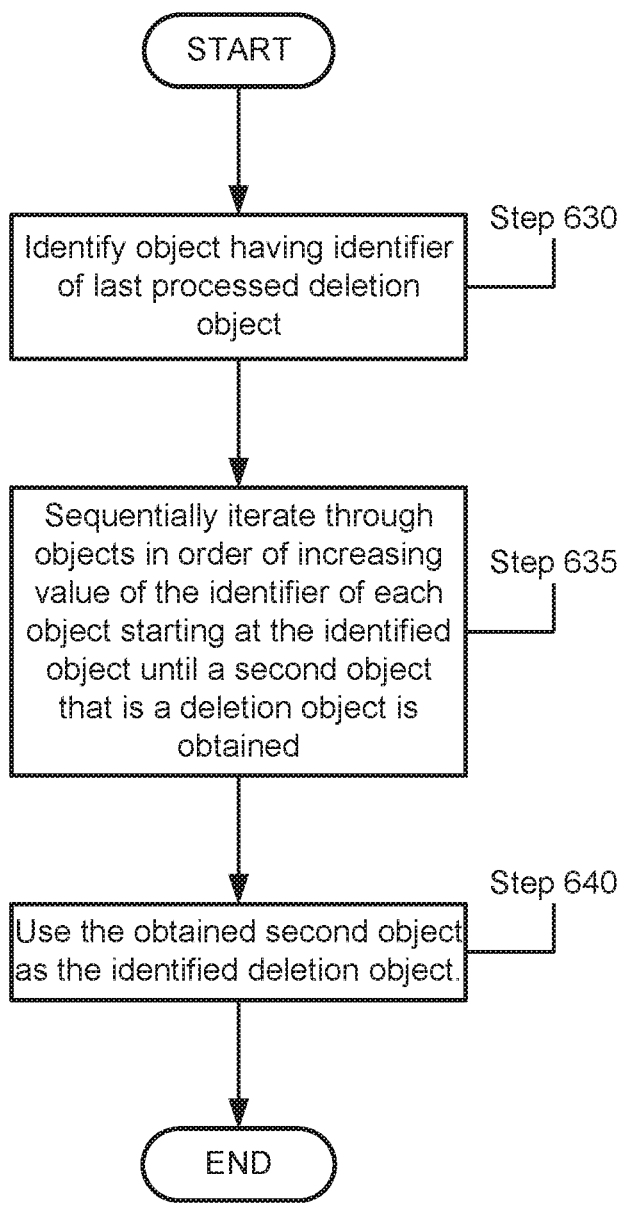
FIG. 6B shows a flowchart of a method of identifying a deletion object while performing garbage collection on a LTR storage of a persistent storage in accordance with one or more embodiments of the invention.

FIG. 6A shows a flowchart of a method in accordance with one or more embodiments of the invention. The method depicted in FIG. 6A may be used to perform garbage collection on an object storage of a LTR storage in accordance with one or more embodiments of the invention. The method shown in FIG. 6A may be performed by, for example, a garbage collector (150, FIG. 1A). Other component of the data management device (110) or the illustrated system may perform the method illustrated in FIG. 6A without departing from the invention.

In Step 600, a last processed deletion object identifier is obtained. The last processed deletion object identifier may specify the identifier of the deletion object that was last processed to completion. As used herein, processing a deletion object to completion means to delete all of the objects specified by the deletion object.

In Step 605, a deletion object is identified that has (i) a next lowest identifier and (ii) an identifier that is greater than the last processed deletion object identifier. In other words, the deletion object having an identifier having a value that is greater than the value of the last processed deletion object identifier and the lowest value of the deletion objects having identifiers having values greater than the last processed deletion object identifier is identified. The deletion object may be identified using the method shown in FIG. 6B. The deletion object may be identified using other methods without departing from the invention.

In Step 610, the identified deletion object is processed. Processing the identified deletion object may result in the LTR data objects specified by the identified deletion object being deleted and the last processed deletion object identifier being updated based on the identifier of the identified deletion object. The identified deletion object may be processed using the method shown in FIG. 6C. The identified deletion object may be processed using other methods without departing from the invention.

In Step 615, it is determined whether all of the deletion objects stored in the object storage have been processed. If all of the deletion objects have been processed, the method may proceed to Step 620. If all of the deletion objects have not been processed, the method proceeds to Step 605.

In Step 620, the last processed deletion object identifier is updated based on the identifier of the object having the highest identifier value stored in the object storage of the LTR storage. In one or more embodiments of the invention, the last processed deletion object identifier may be updated by setting its value to the value of the identifier of the object having the highest identifier value stored in the object storage of the LTR storage.

The method may end following Step 620.

GB shows a flowchart of a method in accordance with one or more embodiments of the invention. The method depicted in FIG. 6B may be used to identify a deletion object in accordance with one or more embodiments of the invention. The method shown in FIG. 6B may be performed by, for example, a garbage collector (150, FIG. 1A). Other component of the data management device (110) or the illustrated system may perform the method illustrated in FIG. 6B without departing from the invention.

In Step 630, an object having an identifier of the last processed deletion object is identified. The object may be identified by matching an identifier of the last processed deletion object to an identifier of the object. In one or more embodiments of the invention, matching the identifiers may include iterating through objects and comparing the identifier of each iterated object to the identifier of the last processed deletion object.

In Step 635, Objects stored in the object storage of the LTR storage are iterated through in order of increasing value of the identifier of each object and starting at the identified object. The iteration may be continued until a deletion object is obtained. In one or more embodiments of the invention, at least one object that is not a deletion object is iterated through before a deletion object is obtained.

In Step 640, the deletion object obtained in step 635 is used as the identified object.

The method may end following Step 640.

Figure 6C:
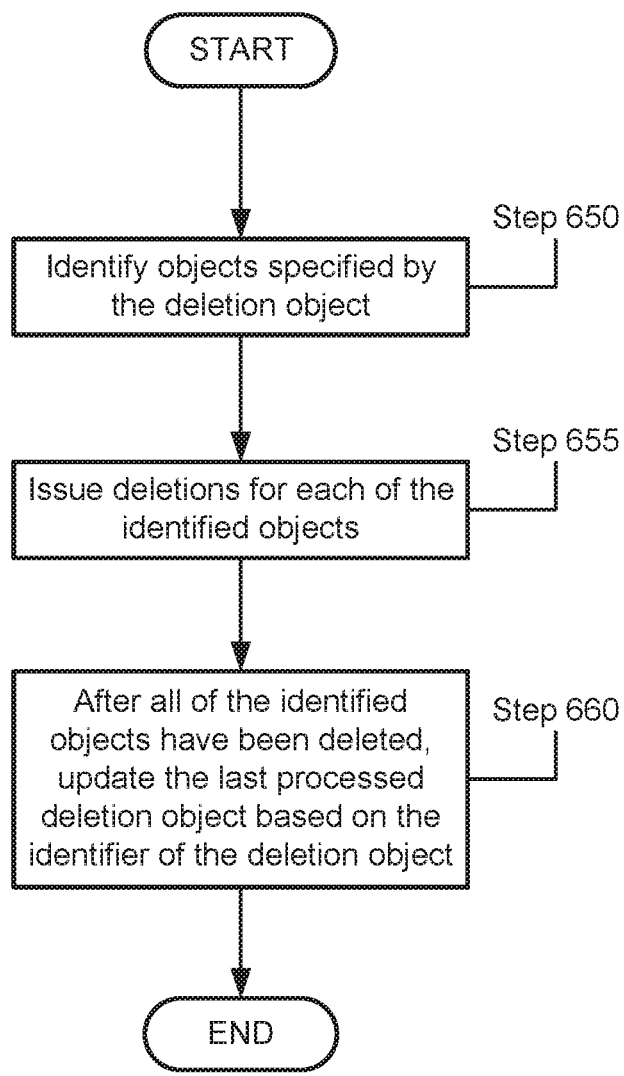
FIG. 6C shows a flowchart of a method of processing a deletion object while performing garbage collection on a LTR storage of a persistent storage in accordance with one or more embodiments of the invention.

FIG. 6C shows a flowchart of a method in accordance with one or more embodiments of the invention. The method depicted in FIG. 6C may be used to process a deletion object in accordance with one or more embodiments of the invention. The method shown in FIG. 6C may be performed by, for example, a garbage collector (150, FIG. 1A). Other component of the data management device (110) or the illustrated system may perform the method illustrated in FIG. 6C without departing from the invention.

In Step 650, objects specified by a deletion object are identified. The object may be identified by comparing identifiers specified by the deletion object to identifiers of objects of an object storage of a LTR storage.

In Step 655, deletions are issued for each of the objects identified in Step 650. The deletions may be queued and processed as input/output capacity of the LTR storage is available.

In Step 660, the last processed deletion object identifier is updated based on the identifier of the deletion object used to identify the objects after all of the identified objects have been deleted.

The method may end following Step 660.

Figure 7:
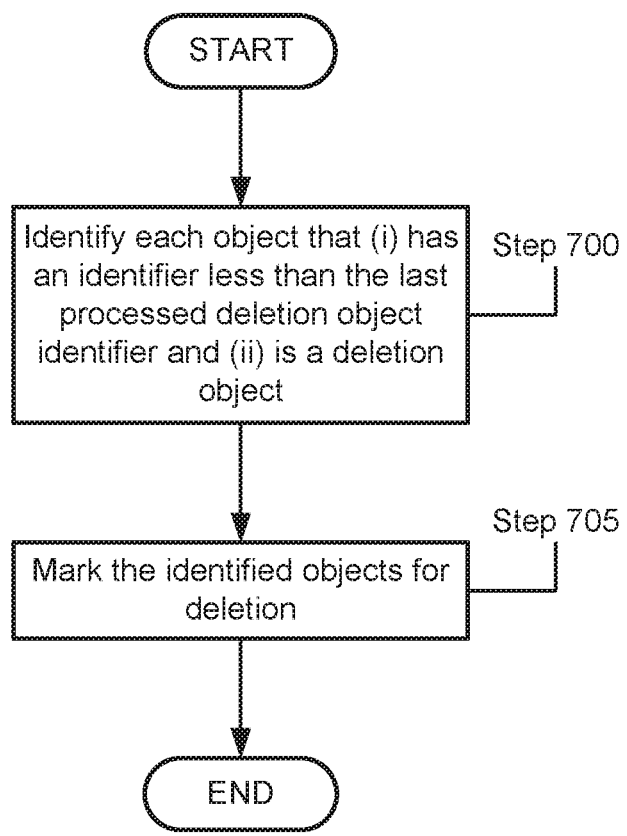
FIG. 7 shows a flowchart of a method of identifying processed deletion objects while performing garbage collection on a LTR storage of a persistent storage in accordance with one or more embodiments of the invention.

FIG. 7 shows a flowchart of a method in accordance with one or more embodiments of the invention. The method depicted in FIG. 7 may be used to remove deletion objects from a LTR storage in accordance with one or more embodiments of the invention. The method shown in FIG. 7 may be performed by, for example, a garbage collector (150, FIG. 1A). Other component of the data management device (110) or the illustrated system may perform the method illustrated in FIG. 7 without departing from the invention.

In Step 700, each object that (i) has an identifier having a value less than the value of the identifier of the last processed deletion object and (ii) is a deletion object is identified.

In Step 705, the objects identified in Step 700 are deleted.

The method may end following Step 700.

Throughout this application, elements of figures may be labeled as A to N. As used herein, the aforementioned labeling means that the element may include any, number of items and does not require that the element include the same number of elements as any other item labeled as A to N. For example, a data structure may include a first element labeled as A and a second element labeled as N. This number convention means that the data structure may include any of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

One or more embodiments of the invention may enable one or more of the following: i) performing garbage collection of data stored in a persistent storage while deduplicating data, ii) improve the available of the data management device for deduplication of data by modifying the deduplication behavior of the data management device before actually removing data, iii) spread the computational/input-output resources used for garbage collection over a longer duration of time to maintain deduplication performance of the data management device.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data management device, comprising:
a persistent storage comprising meta-data of data stored in a long term retention (LTR) storage; and
a processor programmed to:
obtain a file storage request for a file; and
deduplicate the file against segments stored in the LTR storage while performing garbage collection on the LTR storage,
wherein deduplicating the file against segments stored in the LTR storage while performing garbage collection on the LTR storage comprises:
identifying data objects stored in the LTR storage for deletion,
identifying meta-data objects that store meta-data that is associated with the identified data objects,
copying forward the meta-data in the identified meta-data objects that is not associated with the identified data objects to obtain updated meta-data objects,
deduplicating the file using the updated meta-data objects while the identified data objects are stored in the LTR storage, and after deduplicating the file, deleting the identified data objects from the LTR storage, wherein deleting the identified data objects from the LTR storage comprises:
generating a deletion object based on the identified data objects; and
storing the deletion object in the LTR storage, wherein the deletion object comprises a predetermined byte sequence distinguishing the deletion object from the data objects in the LTR storage,
wherein the meta-data is not stored in the LTR storage,
wherein data is stored in a deduplicated object storage comprising a plurality of data objects comprising the data, wherein each data object of the plurality of data objects comprises a plurality of segments of files of the data, and
wherein at least one segment of the segments of the files is used to reconstruct a first file of the files of the data and a second file of the files of the data.

2. The data management device of claim 1, wherein the meta-data is stored in meta-data objects stored in an active storage of the persistent storage.

3. The data management device of claim 2, wherein the meta-data comprises:
fingerprints of segments of files stored in the LTR storage; and
data object identification information that enables data objects that store the segments to be retrieved from the LTR storage.

4. The data management device of claim 1, wherein the LTR storage is a cloud storage.

5. The data management device of claim 1, wherein performing garbage collection on the LTR storage comprises:
deleting a plurality of data objects stored in the LTR storage based on object identification information stored in the deletion object.

6. The data management device of claim 5, wherein the object identification information comprises:
a first entry comprising:
a logical container identifier; and
an offset that specifies a location of a data region within a logical container identified by the logical container identifier.

7. The data management device of claim 5, wherein performing garbage collection on the LTR storage further comprises:
iterating through objects stored in the LTR storage starting at a last processed deletion object in order of increasing identifier value, and
identifying the deletion object based on the iterating.

8. The data management device of claim 5, wherein performing garbage collection on the LTR storage further comprises:
after deleting the plurality of data objects, updating a last processed deletion object identifier stored in an active storage based on an identifier of the deletion object,
wherein the meta-data is stored in the active storage,
wherein the active storage and the LTR storage are different storages.

9. The data management device of claim 5, wherein performing garbage collection on the LTR storage further comprises:
after deleting the plurality of data objects, marking the deletion object for deletion.

10. The data management device of claim 9, wherein marking the deletion object for deletion comprises:
iterating through objects stored in the LTR storage, starting at an object having a smallest identifier value, in order of numerically increasing identifier value until an object having an identifier value specified by a last processed deletion object identifier is reached, and
mark each object of the iterated objects that are deletion objects for deletion.

11. The data management device of claim 1, wherein the identified data object for deletion is a portion of a second file, wherein the second file is different from the file.

12. A method of operating a data management device, comprising:
obtaining, by the data management device, a file storage request specifying a file; and
deduplicating, by the data management device, the file against segments stored in a long term retention (LTR) storage while performing garbage collection on the LTR storage,
wherein deduplicating the file against segments stored in the LTR storage while performing garbage collection on the LTR storage comprises:
identifying, by a data management device, data objects stored in the LTR storage for deletion,
identifying, by a data management device, meta-data objects that store meta-data that is associated with the identified data objects,
copying forward, by a data management device, the meta-data in the identified meta-data objects that is not associated with the identified data objects to obtain updated meta-data objects,
deduplicating, by a data management device, the file using the updated meta-data objects while the identified data objects are stored in the LTR storage, and
after deduplicating the file, deleting, by a data management device, the identified data objects from the LTR storage, wherein deleting the identified data objects from the LTR storage comprises:
generating a deletion object based on the identified data objects; and
storing the deletion object in the LTR storage, wherein the deletion object comprises a predetermined byte sequence distinguishing the deletion object from the data objects in the LTR storage,
wherein the meta-data is not stored in the LTR storage,
wherein data is stored in a deduplicated object storage comprising a plurality of data objects comprising the data, wherein each data object of the plurality of data objects comprises a plurality of segments of files of the data, and
wherein at least one segment of the segments of the files is used to reconstruct a first file of the files of the data and a second file of the files of the data.

13. A non-transitory computer readable medium comprising computer readable program code, which when executed by a computer processor enables the computer processor to perform a method for operating a data management device, the method comprising:
obtaining, by the data management device, a file storage request for a file; and
deduplicating, by the data management device, the file against segments stored in a long term retention (LTR) storage while performing garbage collection on the LTR storage, wherein deduplicating the file against segments stored in the LTR storage while performing garbage collection on the LTR storage comprises:
  identifying, by a data management device, data objects stored in the LTR storage for deletion,
  identifying, by a data management device, meta-data objects that store meta-data that is associated with the identified data objects,
  copying forward, by a data management device, the meta-data in the identified meta-data objects that is not associated with the identified data objects to obtain updated meta-data objects,
  deduplicating, by a data management device, the file using the updated meta-data objects while the identified data objects are stored in the LTR storage, and
  after deduplicating the file, deleting, by a data management device, the identified data objects from the LTR storage, wherein deleting the identified data objects from the LTR storage comprises:
    generating a deletion object based on the identified data objects; and
    storing the deletion object in the LTR storage, wherein the deletion object comprises a predetermined byte sequence distinguishing the deletion object from the data objects in the LTR storage,
wherein the meta-data is not stored in the LTR storage,
wherein data is stored in a deduplicated object storage comprising a plurality of data objects comprising the data, wherein each data object of the plurality of data objects comprises a plurality of segments of files of the data, and
wherein at least one segment of the segments of the files is used to reconstruct a first file of the files of the data and a second file of the files of the data.

* * * * *